Oct. 5, 1965   M. D. STEPATH   3,210,514
CUTTING AND GOUGING TORCH
Filed Oct. 29, 1962   2 Sheets-Sheet 1

INVENTOR.
MYRON D. STEPATH
BY
Browne, Schuyler, and Beveridge
ATTORNEYS

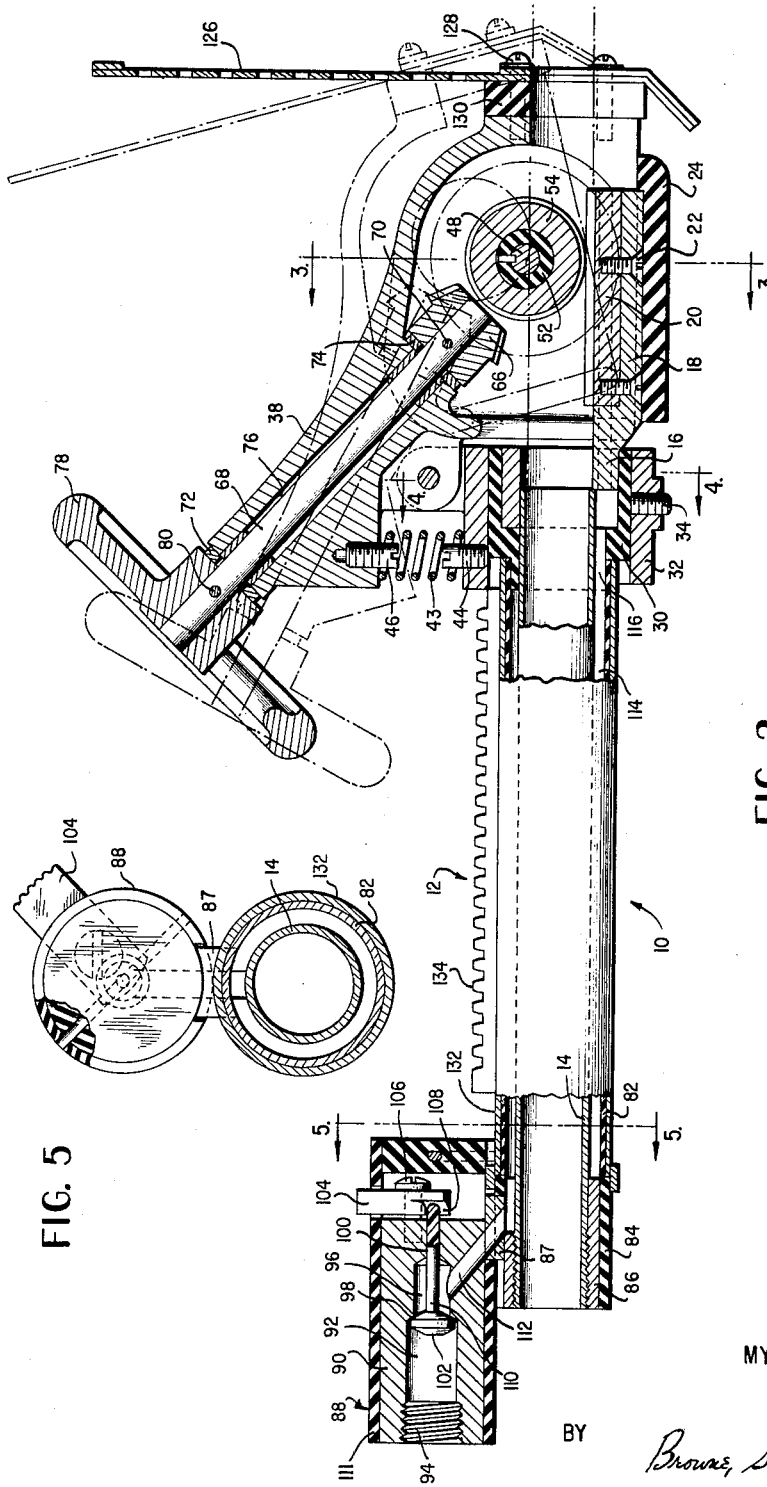

United States Patent Office 3,210,514
Patented Oct. 5, 1965

3,210,514
CUTTING AND GOUGING TORCH
Myron D. Stepath, Lancaster, Ohio, assignor to Arcair Company, Bremerton, Wash., a partnership
Filed Oct. 29, 1962, Ser. No. 233,853
5 Claims. (Cl. 219—70)

This invention relates to an electric arc-gas jet cutting and gouging device, and more particularly to an improved electrode holder or torch.

In the use of the electric arc-gas jet cutting and gouging process in the metal working industry an electrode holder may be mounted on a movable carriage with the electrode projecting longitudinally from the holder. As the electrode is consumed, linear movement of the torch relative to the carriage will maintain the proper distance and angular relationship between the work piece and the electrode and gas jet. Such an electrode holder is disclosed in my United States Patent No. 2,903,554, issued September 8, 1959.

Electric arc-gas jet electrode holders have usually been constructed so adjustment of the electrode along the longitudinal axis of the torch could be accomplished only when the torch was not in use. Thus, to adjust the position of the electrode with respect to the torch, it has been necessary to interrupt the cutting or gouging process before adjusting the position of the electrode, with consequent lost time and cooling of the work.

In torches of this type it has been difficult to accurately control the gas jet because standard gas cocks or valves were used for this purpose.

It is a primary object of this invention to provide an electric arc-gas jet electrode holder or torch in which an electrode may be manually adjusted along the longitudinal axis of the torch while said torch is in operation.

Another object of this invention is to provide an electric arc-gas jet electrode holder having an improved gas jet control.

The foregoing and other objects are achieved in a torch in which an electrode seat is formed with an elongated concave electrode receiving and guiding groove. An electrode seated in the groove is driven in longitudinal feeding movement by a rotating electrode drive wheel which is supported for coaxial rotation with a bevel drive gear. This drive gear is normally driven, through a second gear and shaft, by rotation of a hand wheel. The electrode drive wheel and the driving mechanism is mounted in a bracket assembly which is pivotally mounted to the torch body and spring biased in a direction to assure contact between the electrode and the drive wheel.

Electric current and a gas, such as air, under pressure is supplied to the torch through an air-control valve rigidly mounted on the rear of the torch body and electrically connected to the electrode seat through a current carrying member of the torch body. Control of the flow of gas through the air control valve is maintained by a readily accessible valve actuating member having a cam surface to quickly and easily position the valve to accurately control the flow of gas to the torch.

Other objects and advantages of this invention will become apparent by reference to the following specification taken in conjunction with the accompanying drawings.

In the drawings:

FIG. 2 is a longitudinal view of the electrode holder with certain parts shown in cross section and other parts shown in alternate positions by phantom line;

FIG. 5 is a transverse cross sectional view taken on line 5—5 of FIG. 2.

Figure 1:
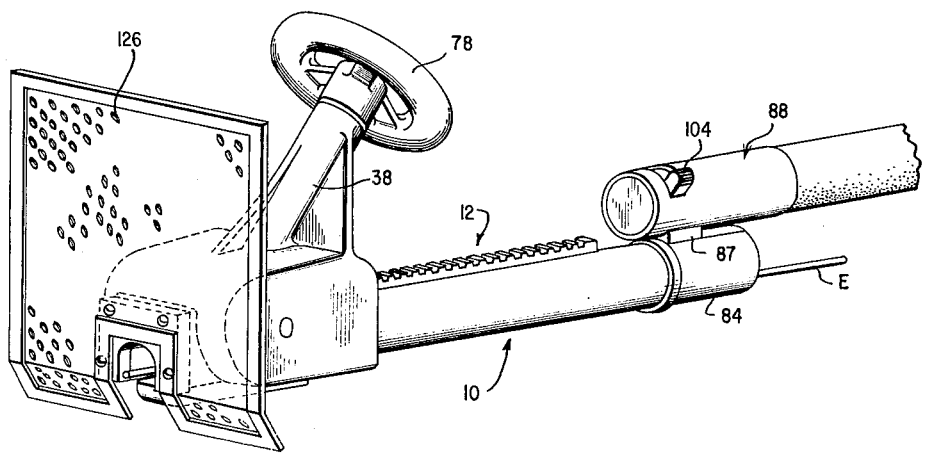
FIG. 1 is a perspective view of an electric arc-gas jet electrode holder embodying the present invention.
Figure 3:
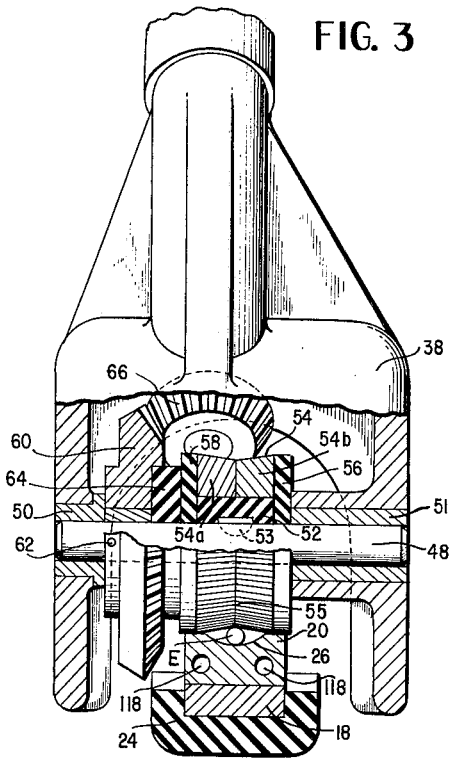
FIG. 3 is a transverse cross section view taken on line 3—3 of FIG. 2.
Figure 4:
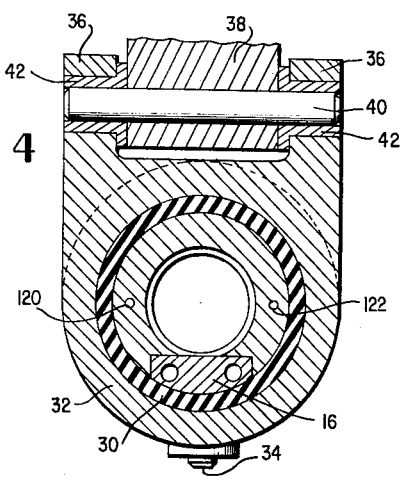
FIG. 4 is a transverse cross sectional view taken on line 4—4 of FIG. 2.

As shown in FIG. 1, an electrode holder, or torch, embodying the invention, designated generally by numeral 10, has a rack 12 extending along the torch 10 for effecting longitudinal feeding movement of the torch in a conventional carriage (not shown).

Referring now to FIG. 2, the main body of torch 10 includes a hollow current carrying tubular member 14, having an electrically conductive body ring 16 secured, as by brazing, to its forward or right hand end to define a radially extending flange on member 14. An axially projecting lip 18 on member 16 defines a support within which an electrode seat 20 is detachably mounted as by screws 22. The electrode seat and support assembly is protected from inadvertent electrical contact with the work piece by insualting block 24.

Seat 20 is elongated and generally rectangular in cross-section, and formed with a groove 26 in its upper surface extending downwardly to form an electrode seat. Groove 26 is longitudinally aligned with the inner surface of current carrying member 14.

An annular collar 30 of electrically insulating material surrounds body ring 16 and the forward end of member 14. Surrounding insulating collar 30 is a mounting ring 32, which is detachably mounted on collar 30 as by locking screw 34. Member 32 has a pair of upwardly extending projections 36 upon which a drive bracket 38 is hingedly mounted by a pin 40 and bushings 42. Drive bracket 38 is spring biased in a clockwise direction about pin 40 as viewed in FIG. 2 by a compression spring 43 located by screw pins 44 and 46.

Structure for driving the electrode E longitudinally along groove 26 in seat 20 includes a shaft 48 journaled in bushings 50 and 51 in main drive bracket 38 and extending axially in a direction normal to the path of movement of the electrode as defined by groove 26. A collar 52 of electrically insulating material is rotatively fixed to shaft 48 as by key 53 and electrode drive wheel 54 is rotatively fixed to collar 52, as by interference fit, for rotation with shaft 48. Wheel 54 has a seriated groove 55 around its periphery to increase the contact area and coefficient of friction between the wheel and electrode E. As an alternate construction, wheel 54 may comprise a pair of symmetrical, oppposedly mounted beveled wheel members 54a and 54b. To electrically insulate wheel 54 from the main drive bracket 38, a pair of shielding discs 56 and 58 are mounted on shaft 48 at the side of wheel 52.

A bevel gear 60 is rotatively fixed to shaft 48 to one side of drive wheel 54 as by roll pin 62, and spacing member 64 may be used between gear 60 and drive wheel 54. Meshing with gear 60 is a second bevel gear 66 rotatively fixed to the lower end of shaft 68 as by roll pin 70. Shaft 68 is journaled for rotation, as by bushings 72 and 74, within a bore 76 in main drive bracket 38. A hand wheel 78 is rotatively fixed to the other end of shaft 68 as by roll pin 80, so that rotation of hand wheel 78 will result in rotation of electrode drive wheel 54.

Referring again to FIG. 2, a hollow cylindrical sleeve 82 of electrically insulating material surrounds the major portions of the length of current carrying member 14. Sleeve 82 is supported on member 14 by insulating collar 30 and a collar 84 of electrically insulating material mounted on sleeve 86 of electrically conductive material threadedly mounted on the back (left hand) end of member 14. Rigidly attached to member 86, as by brazing, is a spacing block 87 of electrically conductive material (FIG. 1), to which is rigidly attached, as by brazing, an air control valve generally indicated by numeral 88. Collar 84 surrounds sleeve 86 except in the area of block 87.

Valve 88 includes a cylindrical main body member 90 of electrically conductive material having a first concentric bore 92 with internal threads 94 near its back (left hand) end for attaching a suitable conduit to supply electrical current and a gas, such as air, under pressure to the torch. A second concentric bore 96 of smaller diameter extends into the body member beyond bore 92, forming a valve seat 98 at the termination of bore 92. A third concentric bore 100 of diameter smaller than bore 96 extends through member 90 and forms a guide for valve 102. A valve actuating cam 104 of electrical insulating material is rotatably attached as by a valve cam screw 106 to the front end of member 90 at a point radial outboard of bore 100. One end of cam 104 projects radially beyond the outer surface of member 90 so that it is readily accessible for manual actuation of the valve. The opposite end of member 104 has a cam surface 108 on which the end of valve stem 110 bears, so that manual rotation of member 104 about screw 106 will produce axial movement of the valve and thereby accurately control the flow of gas through the torch. A sleeve 111 of electrical insulating material surrounds the current bearing members of the valve.

A radial bore 112 extends from the second concentric bore 96 through valve body 90 and spacer member 87 to communicate with a cut-out portion of member 84 to provide a passage for the flow of gas from the valve to the chamber 114 between current carrying member 14 and insulating member 82.

Insulating collar 30 is slotted as at 116 to provide communication between passage 114 and longitudinally extending passages or orifices 118 extending through elements 16, 18 and 20. Orifices 118 are oriented to direct a stream of gas issuing from passage 114 along the axis of the electrode to forcibly eject molten metal from the work piece as the metal is melted by the electric arc at the electrode tip.

Gas under pressure is also discharged from passage 114 through passages 120 and 122 which are oriented to direct converging streams of gas which impinge on opposite sides of an electrode seated in groove 26. When the end of a consumed electrode passes beneath the drive wheel 54, the jets from passages 120 and 122 act to forcibly eject the end of the electrode clear of the torch to prevent arcing between the work and the torch.

A perforated steel radiation shield 126 is attached as by screws 128 to the forward end of bracket 38 to protect the torch and the operator's hand from the radiant energy of the arc. A block insulating material 130 is installed between the shield and the end of member 38 to minimize the transfer of heat from the shield to bracket 38 by conduction.

To adapt the torch for use in a suitable steady-rest or machine cutting environment, a metal housing 132 carrying a longitudinally extending rack 12 is mounted on the outer surface of insulating sleeve 82 and is electrically insulated from any current carrying members of the torch.

In operation, a suitable conduit is coupled within the threaded bore 94 of valve body 90 to supply electrical current to member 90 and a gas, such as air, under pressure to valve chamber 92. Electric current is carried through spacer block 87, sleeve 86, current carrying member 14, and the electrode seat 20 to an electrode E supported in groove 26 by drive wheel 54.

Gas under pressure tends to force valve 102 toward a seated or closed position against the reaction force exerted by cam surface 108 of member 104 acting on the end of valve stem 110. By manually adjusting the position of member 104, the desired amount of air is permitted to flow through the valve and into chamber 114. From chamber 114, the gas passes through passages 118 and 119 to be ejected along the electrode E to forcibly remove molten metal from the work piece, and through passages 120 and 122 to cool the electrode and to forcibly eject the end of a consumed electrode as it passes beneath drive wheel 54.

An electrode may be inserted in the torch, from either end of the torch, by depressing hand wheel 78 against the force of spring 43, thereby lifting drive wheel 54 off electrode seat 20. Once inserted, the electrode may be adjusted to any desired position by manually turning the hand wheel 78 in the appropriate direction.

While I have described one embodiment of my invention, it will be apparent that the disclosed embodiment may be modified. Therefore, the foregoing description is to be considered exemplary rather than limiting and the true scope of my invention is that defined in the following claims.

What is claimed is:

1. An electric arc-gas jet cutting and gouging apparatus having a housing, a hollow open ended current carrying member supported within said housing, an electrode seat carried by one end of said current carrying member to receive and support an elongated electrode disposed within said current carrying member, means supplying electric current to said electrode seat, means for directing a jet of gas longitudinally along the electrode, connector means on said housing for supplying electric current to said current carrying member and gas under pressure to said gas jet directing means, an electrode feed mechanism comprising a drive bracket mounted on said housing opposite said electrode seat for pivotal movement about an axis perpendicular to and spaced from the longitudinal axis of an electrode supported in said seat, an electrode drive wheel mounted in said drive bracket for rotation about an axis perpendicular to and spaced from the longitudinal axis of an electrode supported in said seat, a first bevel gear member mounted for coaxial rotation with said drive wheel, a second bevel gear member rotatably mounted in said drive bracket for operative engagement with said first bevel gear member, means for rotating said second bevel gear member, and biasing means urging said drive bracket about said pivotal axis for urging said drive wheel and said seat toward one another to engage and feed an electrode along said seat.

2. An electric arc-gas jet cutting and gouging apparatus having a housing, a hollow open ended current carrying member supported within said housing, an electrode seat carried by one end of said current carrying member to receive and support an elongated electrode disposed within said current carrying member, means for directing a jet of gas longitudinally along the electrode, connector means on said housing for supplying electric current to said current carrying member and gas under pressure to said gas jet directing means, electrode feed mechanism comprising a drive bracket mounted on said housing opposite said electrode seat for pivotal movement about an axis perpendicular to and spaced from the longitudinal axis of an electrode supported in said seat, an electrode drive wheel mounted in said drive bracket for rotation about an axis perpendicular to and spaced from the longitudinal axis of an electrode supported in said seat, a first bevel gear member mounted for coaxial rotation with said drive wheel, a second bevel gear member rotatably mounted in said drive bracket for operative engagement with said first bevel gear member, means for rotating said second bevel gear member, and resilient means biasing said drive bracket about said pivotal axis and urging said drive wheel and said seat toward one another to engage and feed an electrode along said seat.

3. An electric arc-gas jet cutting and gouging apparatus as defined in claim 1 wherein said means for rotating said second bevel gear member includes an elongated shaft rotatably mounted in said drive bracket, said second bevel gear member being rotatably fixed on one end of said shaft and a hand wheel rotatably fixed to the other of said shaft for manual rotation thereof.

4. An electric arc-gas jet cutting and gouging apparatus as defined in claim 2 wherein said means for rotating said second bevel gear member includes an elongated shaft rotatably mounted in said drive bracket, said second bevel gear member being rotatably fixed on one end of said shaft, and a hand wheel rotatably fixed to the other of said shaft for manual rotation thereof.

5. An electric arc cutting and gouging apparatus as defined in claim 4 including a heat shield mounted on said bracket and projecting upwardly therefrom in position to shield said hand wheel from the radiant heat of the electric arc when said cutting and gouging apparatus is in operation.

References Cited by the Examiner

UNITED STATES PATENTS 2,329,904  9/43  Howard _____ 219—75 X
2,441,551  5/48  Anderson _____ 219—130
2,903,554  9/59  Stepath _____ 219—69

FOREIGN PATENTS 143,331  5/20  Great Britain.

RICHARD M. WOOD, *Primary Examiner.*